US008875216B2

(12) United States Patent
Burns et al.

(10) Patent No.: US 8,875,216 B2
(45) Date of Patent: Oct. 28, 2014

(54) METHODS AND APPARATUS FOR DYNAMIC VOLUME PUNCH-THROUGH

(71) Applicant: EchoStar Technologies L.L.C., Englewood, CO (US)

(72) Inventors: Christopher Burns, Centennial, CO (US); Adam Schafer, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/286,127

(22) Filed: May 23, 2014

(65) Prior Publication Data

US 2014/0253817 A1    Sep. 11, 2014

Related U.S. Application Data

(62) Division of application No. 13/677,101, filed on Nov. 14, 2012, now Pat. No. 8,749,716.

(51) Int. Cl.
 *H04N 7/173* (2011.01)
 *H04N 5/60* (2006.01)
 *H04N 5/63* (2006.01)

(52) U.S. Cl.
 USPC ............. 725/133; 725/134; 725/37; 348/730; 348/738

(58) Field of Classification Search
 USPC ............ 348/734, 738, 725, 730; 725/37, 100, 725/131, 133, 134, 139, 141, 142, 151, 153
 IPC ................. H04N 5/44,5/60, 5/445, 7/16, 7/173, H04N 5/63
 See application file for complete search history.

(56) References Cited

U.S. PATENT DOCUMENTS

| | | |
|---|---|---|
| 6,239,845 B1 | 5/2001 | Itagaki et al. |
| 8,098,337 B2 | 1/2012 | Martch |
| 2006/0184974 A1 | 8/2006 | Sakao et al. |
| 2009/0156051 A1 | 6/2009 | Doyle et al. |
| 2010/0125890 A1 | 5/2010 | Levine et al. |
| 2010/0218214 A1 | 8/2010 | Fan et al. |
| 2011/0083147 A1 | 4/2011 | Ergen et al. |
| 2013/0127977 A1 | 5/2013 | Iwabuchi et al. |

FOREIGN PATENT DOCUMENTS

WO    2012032193 A1    3/2012

OTHER PUBLICATIONS

ZigBee Alliance, Inc., "ZigBee RF4CE Specification Version 1.0," Mar. 17, 2009, 101 pages.
HDMI Licensing, LLC, "High-Definition Multimedia Interface, Specification Version 1.3a," Nov. 10, 2006, 276 pages.
International Search Report from PCT/US2013/063092 mailed Jan. 20, 2014, 3 pages.

*Primary Examiner* — Sherrie Hsia
(74) *Attorney, Agent, or Firm* — Seed IP Law Group PLLC

(57) ABSTRACT

Methods and apparatus for dynamic volume punch through in a home entertainment system that includes a client device that receives programming signals coupled to an audio/video amplifier, and a television coupled to the audio/video amplifier. A remote control that communicates over a radio frequency interface with the client device "punches through" volume adjustment commands from a user to either the audio/video amplifier or to the television depending on the power state of the audio/video amplifier. The remote control receives the information indicating this power state from the client device that detects the power state of the audio/video amplifier through a bidirectional bus in a cable interface, for example, HDMI-CEC bus. The volume is "punched through" to the audio/video amplifier or to the television over a second communication link, for example an infrared optical interface.

20 Claims, 4 Drawing Sheets

METHODS AND APPARATUS FOR DYNAMIC VOLUME PUNCH-THROUGH

CROSS-REFERENCE TO RELATED APPLICATION

This is a Divisional Application of U.S. application Ser. No. 13/677,101, filed Nov. 14, 2012, now allowed, which application is incorporated herein by reference in its entirety.

TECHNICAL FIELD

The present disclosure generally relates to the control of audio/video devices, and more particularly to the methods and apparatus for controlling the volume of a program through the use of a remote control.

DESCRIPTION OF THE RELATED ART

Most modern television viewers subscribe to broadband service providers or content aggregators to get their television programming. Subscribers generally receive their television programming through a set top box that is capable of demodulating the signal received through the broadcast medium and converting the demodulated signal into a display format compatible with the viewing device, such as a television. In addition to receiving and processing the received programming signals, the set top box typically provides other features like presenting viewers with electronic program guides (EPGs), recording capability (digital or personal video recorder), and support for trick commands.

It is not uncommon for a subscriber to configure his or her set to box in a setting more elaborate than the standard configuration of a set top box and a television. To have the full theater experience, the subscriber may add an audio/video amplifier, which is sometimes called an AV receiver (AVR), and a set of speakers, thus creating a home entertainment system. Having the audio of the television programming amplified by the AV receiver to the speakers can provide the subscriber with a surround sound and a much more enhanced listening experience compared to listening through the speakers integrated on the television.

A subscriber interacts with the set top box using a remote control, and generally, the same remote control can be used to control other devices in the home theater system. However, because the remote control has to address each of those components using different codes, the subscriber usually has to manually change the MODE of the remote control before the command is sent. For example, to change the viewed channel, the remote control must interact with the set top box or cable box, therefore, the subscriber puts the remote control in a SAT or CABLE mode before depressing the channel number button or the channel up/down button. To change a volume of the television, the subscriber generally puts the remote control in a TV mode before depressing the volume up/down button. It is, therefore, desirable to simplify a subscriber's interaction with the complete entertainment system and to reduce the number of button presses the subscriber has to make to control the components of the system.

BRIEF SUMMARY

According to one embodiment, a method of controlling audio volume output level in an entertainment system is provided. A remote control receives a mode selection from a user, placing it in a first mode which indicates that a client device is the device to control. The remote control establishes a communication link with the client device and receives a power status of a first audio/video device coupled to the client device, the power status of the first audio/video device detected having been detected by the client device. Upon detecting that the first audio/video device is in a power status that is other than fully ON, the remote control controls the output audio level of a second audio/video device coupled to the first audio/video device while remaining in the first mode. In one embodiment, controlling the output audio level of the second audio/video device includes pairing with the second audio/video device and transmitting the audio level adjustment command over a wireless link. In another aspect of the embodiment, controlling an output audio level of a second audio/video device includes selecting a control code associated with the second audio/video device from a memory location and transmitting the control code together with an audio level adjustment command to the second audio/video device over a second wireless interface. In one embodiment, the second wireless interface is an Infrared communication interface.

In one embodiment, the client device detects the power status of the first audio/video device by sending a request to the first audio/video device for its power status and receiving a response over a bidirectional control bus. In another embodiment, the bidirectional control bus is a CEO bus of the HDMI, the first audio/video device is an audio/video receiver and the second audio/video device is a television.

In another embodiment, a remote control with a user interface section to receive a mode selection and audio adjustment input from a user is provided. The remote control also includes a transceiver section configured to receive a message from a client device over a first wireless interface, the message indicating that a first audio/video device coupled to the client device is in a power status mode other than fully ON. The remote control also includes a transmitter section configured to send a plurality of commands to a plurality of electronic devices over a second wireless interface, and the plurality of electronic devices includes the first audio/video device and a second audio/video device coupled to the first audio/video device. The remote control further includes a processing section that is coupled to a memory section configured to store a plurality of profiles associated with the plurality of electronic devices, the processing section configured to, upon receiving the message, instruct the transmitter section to pair with the second audio/video device and, upon receiving the audio adjustment input from the user, the transmitter transmits a command for output audio adjustment to the second audio/video device.

In one embodiment, the mode selection and the audio level adjustment input are based on the user's interaction with a plurality of buttons on the remote control.

In yet another embodiment, a client device that includes a tuning section coupled to a processing section is presented, the tuning section configured to receive television programming signals. The client device also includes, coupled to the processing section, a transceiving section to communicate with a remote control device over a wireless interface, a high definition multimedia interface connector that has a control pin, and a control bus coupled to the control pin and to a monitoring section. The client device further includes the monitoring section coupled to the high definition multimedia interface connector configured to detect a power status of a first electronic device on the control bus and to inform a processing section of the power status, the processing section configured to send the power status of the first electronic device in a first message to the remote control device. The client device may also include an antenna in an embodiment.

BRIEF DESCRIPTION OF THE SEVERAL VIEWS OF THE DRAWINGS

FIG. 5 is a flowchart showing an exemplary process for a dynamic volume punch through.

DETAILED DESCRIPTION

Figure 1A:
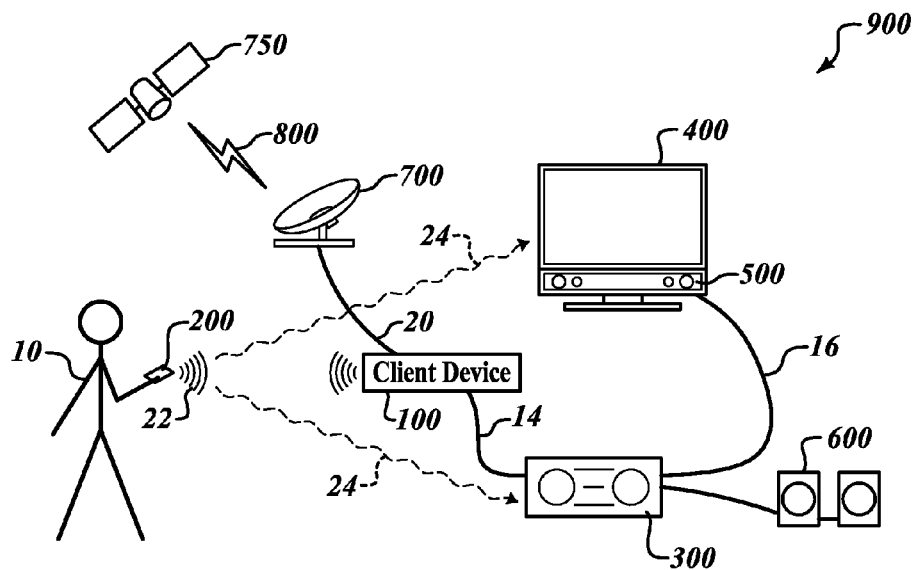
FIGS. 1A and 1B illustrate an exemplary entertainment system.

In the following description, certain specific details are set forth in order to provide a thorough understanding of various embodiments of the disclosure. However, one skilled in the art will understand that the disclosure may be practiced without these specific details. In some instances, well-known interfaces associated with audio/video have not been described in detail to avoid obscuring the description of the embodiments of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

Figure 1B:
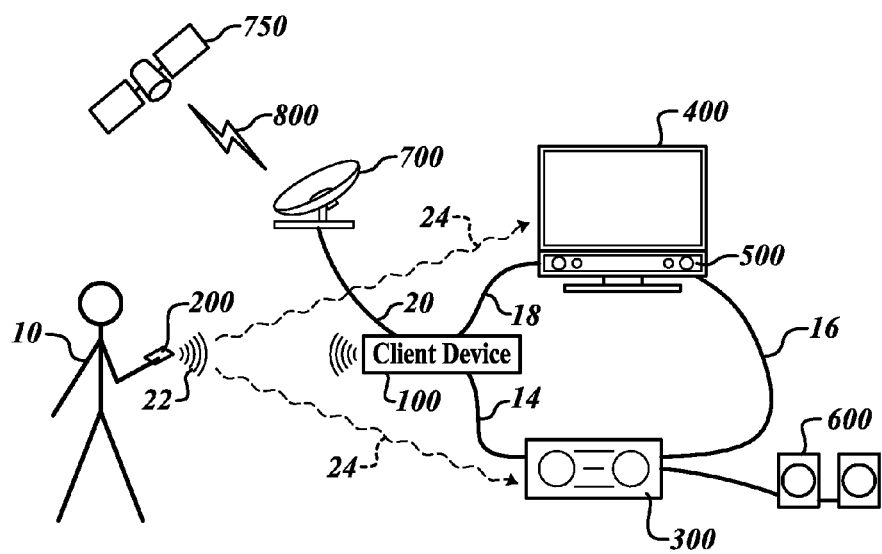

FIGS. 1A and 1B show example configurations of a home entertainment system 900 in which embodiments of the Dynamic Volume Punch Through may be implemented. In FIGS. 1A and 1B, the home entertainment system includes a remote control 200, a client device 100, an AV receiver 300 and display device 400. The AV receiver 300 is connected to the client device 100 via a first cable system 14 and to the display device 400 via a second cable system 16. In FIG. 1B, in addition to being connected to AV receiver 300, display device 400 is also connected to client device 100 via a third cable system 18. The AV receiver 300 is further connected to one or more speakers 600.

Client device 100 is configured to receive, demodulate, decode, and process signals received from service providers for subsequent presentation on a display device 400. Client device 100 may also be configured to record the signals received from service providers. In one embodiment, client device 100 receives digital broadcast satellite signal 800 at antenna 700 and fourth cable system 20. Client device 100 provides multiple connectors to output video and audio signals. The connectors may include Digital Audio, HDMI, and Component video, S-video, Composite video, and Analog Audio. Client device 100 may also provide standard interface connectors like Ethernet and USB. One skilled in the art will recognize that there are a variety of other connectors that may be incorporated in the client device. Client device 100 monitors the status of electronic components with which it interfaces, such as their presence and their power status. In one embodiment, client device 100 monitors the power status of an electronic component connected through an HDMI cable to its HDMI connector. In other embodiments, the presence or power status of electronic components may be monitored through interfaces over other standard connectors like Ethernet. Client device 100 communicates with remote control 200 over first wireless communication link 22.

Display device 400 is any device capable of presenting images to a viewer. In various embodiments, display device 400 is a television compliant with any digital or analog protocol standards or formats. Display device 400 may include speakers 500 to present audio corresponding to images of a video to the viewer. In other embodiments, display device 400 is configured to output audio to external speakers. An off-the-shelf display device, like a television, generally has multiple connectors such as coax, S-Video, and composite video to receive audio and video signals from multiple sources. Some display devices also provide HDMI or DVI connectors, and sometimes RJ45 connectors. In one embodiment, the second cable system 16 is an S-video cable. In another embodiment, the second cable system 16 is an HDMI cable. In a home entertainment system configuration in which display device 400 is connected to client device 100 via third cable system 18, third cable system 18 may be HDMI or composite video with analog audio. Display device 400 receives communication from remote control 200 over the second wireless communication link 24.

User 10 controls each component in the home entertainment system 900 using remote control 200. Remote control 200 is configured to receive commands from user 10 and transmits signals representing the received input commands to the target component. In one embodiment, remote control 200 includes various buttons, sliders, rocker switches and/or other features for receiving physical input from user 10. In other embodiments, remote control 200 is a touch-pad or other handheld device able to receive input from user 10 in any multi-dimensional format, for example in Cartesian, polar or spherical coordinates. In one embodiment, user 10 applies input with a finger, stylus or other object on a touch-pad. As user 10 interacts with the user interface features, remote control 200 produces an appropriate signal and transmits the signal over first wireless communication link 22 or over second wireless communication link 24. Each transmitted signal is configured to be understandable by the target component.

AV receiver 300 is a consumer electronic with a primary purpose of amplifying sound and routing video signals to a display device. An off-the-shelf AV receiver generally has multiple standard connectors. In one embodiment, the AV receiver 300 includes an HDMI port, and the first cable system 14 is an HDMI cable. AV receiver 300 may have additional standard connectors like a second HDMI, coax, S-Video, or composite video (RGB). AV receiver 300 receives communication from remote control 200 over the second wireless communication link 24.

Remote control 200 is capable of a two-way communication with client device 100 over a first wireless communication link 22. In one embodiment, the first wireless communication link 22 is a bidirectional Radio Frequency link in the 2.4 GHz frequency band. In other embodiments, the first wireless communication link 22 may be per IEEE 802.15.1 standards, per IEEE 802.11 standards, or other bidirectional radio frequency wireless protocol. Remote control 200 transmits commands to display device 400 and AV receiver 300 over the second wireless communication link 24. In one embodiment, the second wireless communication link 24 is an Infrared communication. To send commands received from user 10 to display device 400, remote control 200 is configured to transmit the commands over second wireless communication link 24 with control codes associated with display device 400 so that display device 400 correctly receives and decodes the commands. Commands with control codes associated with display device 400 are ignored by AV receiver 300. Alternatively, to send input commands from user 100 to AV receiver 300, remote control 200 is configured to transmit the commands with control codes associated with AV receiver 300.

Remote control 200 includes MODE selection input. User 10 informs remote control 200 with which component in the home entertainment system 900 he or she wishes to communicate by selecting a MODE, and remote control 200 determines the transmission method and protocol to use based on the selected mode. In one embodiment, to control client device 100, user 10 puts the remote control 200 in SAT mode. In another embodiment, to control AV receiver 300, user 10 puts the remote control 200 in AUX mode. In yet another embodiment, to control display device 400, user 10 puts the remote control 200 in TV mode.

Figure 2:
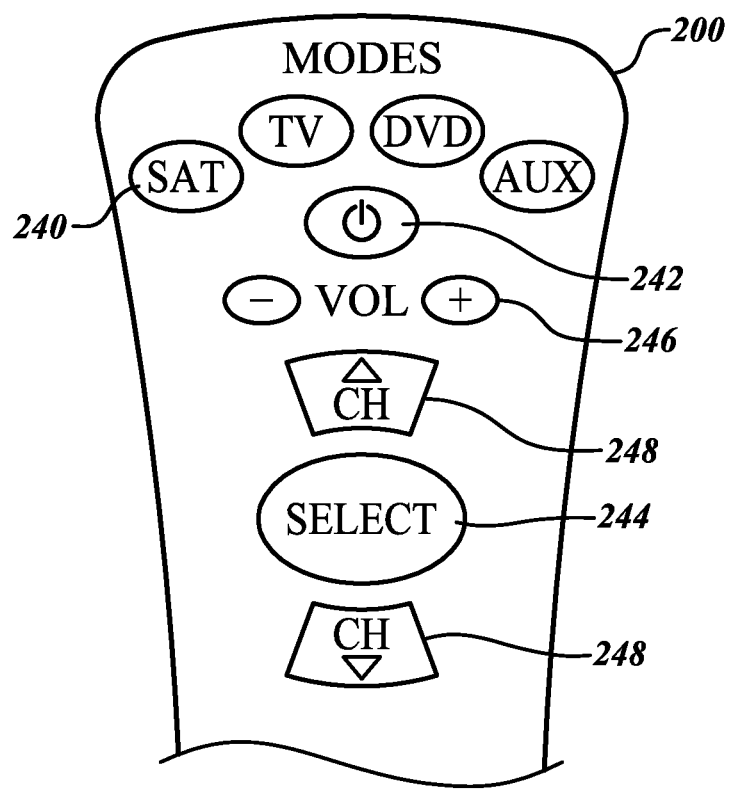
FIG. 2 is a detailed view of an exemplary remote control.

FIG. 2 shows an exemplary layout of one embodiment of remote control 200. A power button 242 is provided for the remote control 200 to turn ON and OFF an electronic device associated with a selected mode of the remote control. MODE buttons or keys 240 are provided for selection of modes by user 10. In FIG. 2, four modes are shown (TV, SAT, DVD, and AUX). More or less modes may be provided in various embodiments of remote control 200. Volume up and down keys 246 may be used to adjust the volume of AV receiver 300 or display device 400. Channel up and down keys 248 or Select key 244 may be used to select a program to view.

User 10 initiates interaction with the client device 100 using remote control 200 by placing the remote control 200 in a MODE that causes remote control 200 to know that the next command received from user 10 is intended for client device 100, referred to herein as the FIRST MODE. For embodiments in which client device is a set top box for receiving satellite broadcast signals, the FIRST MODE is "SAT" mode. In other embodiments, the FIRST MODE may be "CABLE". User 10 also engages AV receiver 300 by putting AV receiver 300 in fully ON power state, and having audio output through speakers 600. The fully ON power state of AV receiver 300 is detected by client device 100 through first cable system 14 and this information is transmitted to remote control 200 over first wireless communication link 22. User 10 then selects a channel of a live program or a recording to watch by interacting with client device 100. Client device 100 proceeds to output the video and audio signals to AV receiver 300 over first cable system 14, and AV receiver 300 in turn outputs audio to speakers 600 and relays video and audio streams to display device 400 over second cable system 16. To control the volume of audio output to speakers 600 using remote control 200, commands for volume adjustment as input by user 10 are to be transmitted to AV receiver 300 over second wireless communication link 24. Remote control 200, having been informed by client device 100 that AV receiver 300 is in fully ON state, transmits the volume adjustment commands over the second wireless communication link 24 with appropriate control codes to AV receiver 300, effectively "punching through" the FIRST MODE (the mode in which the client device 100 is the target device) so that user 10 does not have to switch the remote control 200 to another MODE before the volume adjustment command can be transmitted appropriately to the AV receiver 300. In one embodiment, user 10 can keep remote control 200 in SAT mode while controlling the volume of AV receiver 300.

When user 100 disengages AV receiver 300 from the video feed to listen to the audio through speakers 500 instead, the AV receiver 300 is placed in a low power or standby mode and is not in a fully ON power state. The client device 100 detects the power status of AV receiver 300 through first cable system 14 as not fully ON and transmits this power status information to remote control 200 over first wireless communication link 22. Since the AV receiver 300 is not in a fully ON power state, it is desired to control the volume of audio output to speakers 500 using remote control 200. To do this, commands for volume adjustment as input by user 10 are to be transmitted to display device 400. Remote control 200, having been informed by client device 100 that AV receiver 300 is in a state other than fully ON, transmits volume adjustment commands over the second wireless communication link 24 with the appropriate control codes to display device 400, effectively "punching through" the FIRST MODE, relieving user 10 from having to switch remote control 200 to another MODE before sending the volume adjustment command appropriately to display device 400. In one embodiment, remote control 200 remains in SAT mode while controlling volume of a television when the AV receiver 300 is not in the fully ON power state.

Figure 3:
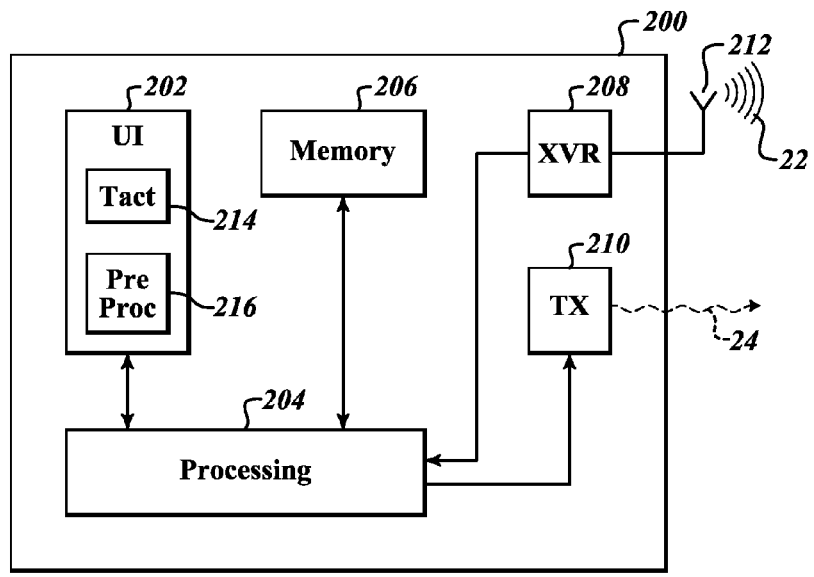
FIG. 3 is an exemplary block diagram of a remote control.

FIG. 3 is a block diagram of exemplary functional elements of one embodiment of a remote control 200 in the disclosure. In general, remote control 200 includes a user interface section 202, a processing section 204 that is coupled to memory 206, a transceiver module 208, a transmit module 210, and an antenna 212.

User interface section 202 is coupled to processing section 204 and includes the tactile elements 214 used by user 10 to enter commands and their front end processing 216. User interface section 202 is configured to receive physical signals from the tactile elements 214, and preprocess those signals in the front end processing 216 before forwarding them to processing section 204. In one embodiment, preprocessing includes debouncing or noise removal.

Transceiver module 208 is coupled to processing section 204 and antenna 212. Transceiver module 208 includes a transmitter and a receiver, the transmitter configured to generate electrical signals suitable for wireless transmission, and the receiver configured to generate signals suitable for digital processing. In some embodiments, transceiver module 208 is further configured to demodulate wireless signals received from antenna 212. Transceiver module 208 transmits user commands intended for client device 100. Examples of such user commands include channel selection, record command, and trick commands. Transceiver module 208 receives information about the power state of AV receiver 300 from client device 100 and forwards the received information to processing section 204. Transceiver module 208 maybe implemented in hardware, software, firmware or combination thereof. In one embodiment transceiver module 208 is a 2.4Gh IEEE 802.15.4-compliant transceiver. Examples of IEEE 802.15.4-compliant transceiver modules are MRF24J40 from Microchip and AT86RF230/1 from Atmel Semiconductor.

Antenna 212 is configured to provide two way transmission of data electromagnetically in free space. Antenna 212 transforms electrical signals into radio frequency electromagnetic waves and transforms radio frequency electromagnetic waves into electrical signals.

Transmit module 210 is configured to transmit wireless signals over the second wireless communication link 24. In one embodiment, transmit module 210 includes an infrared transmitter and commands sent over the second wireless communication link 24 are compliant with IrDA IR protocol.

Processing section 204 is configured to determine to which device a command from user 10 should be transmitted. Processing section 204 generally considers the MODE selected by user 10 to make the determination. Based on the determination, processing section 204 prepares the command for transmission over the first wireless communication link 22 or over the second wireless communication link 24. In one embodiment, the first wireless communication link 22 is a radio frequency link and the second wireless communication link is an infrared optical communication link. One skilled in the art recognizes that other wireless communication links to client device 100, AV receiver 300 and display device 400 are available and can be used in other embodiments.

Processing section 204 is further configured to allow volume "punch through", meaning that while staying in a FIRST MODE selected by user 10 to communicate with client device 100, a volume adjustment command is transmitted to the AV receiver 300 or display device 400. In one embodiment, the FIRST MODE is SAT mode. Generally, when placed in the FIRST MODE, remote control 200 transmits subsequent commands over the first wireless communication link 22 to client device 100. When "punching through" a volume adjustment command, processing section 204 prepares the command for transmission over the second wireless communication link 24 and retrieves the appropriate control codes or pairing indicia from memory 206 to send with the commands. Because the control codes or pairing indicia for AV receiver 300 and display device 400 are different, processing section 204 determines to which device the volume adjustment is to be "punched through." Processing section 204 uses information about the power state of AV receiver 300 to determine whether to "punch through" the volume adjustment to AV receiver 300 or display device 400. Once the "punch through" determination is made, the remote control 200 sends the volume adjustment signal to the appropriate device.

Processing section 204 may be implemented in hardware, software or a combination of hardware and software. In one embodiment, processor section 204 includes a low power device with a ZigBee RF4CE compliant protocol stack. An example of a low power device with RF4CE protocol stack is PIC24F16 from Microchip. Signal output from transceiver module 208 is routed to antenna 212 for transmission over the first wireless communication link 22.

In one embodiment, processor section 204 is combined with transceiver module 208 in an integrated RF4CE compliant platform, and output from this RF4CE compliant platform is further routed to antenna 212 for transmission over the first wireless communication link 22. In other embodiments, RF4CE serves as a network layer built on top of the 802.15.4 standard's PHY/MAC layer, using a subset of channels within the 802.15.4 2.4 Ghz frequency band. Examples of RF4CE compliant platforms are CC2533 from Texas Instruments, MC13213 and the MC1322X family from Freescale Semiconductor, STM32W108C8 from STMicroelectronics and AT86FR23x from Atmel Semiconductor.

Memory 206 is coupled to processing section 204 and is configured to store instructions and data. Memory 206 includes volatile and non volatile memory space. In one embodiment, non volatile memory space is a Flash device and volatile memory space is RAM. Memory 206 is further configured to store control codes or other pairing indicia needed to communicate with various components to be controlled by remote control 200. In one embodiment, memory 206 and processing section 204 may be packaged in the same device package. In other embodiments, memory 206 may be packaged in the same device package with some of the functionality of the processing section 204.

Figure 4:
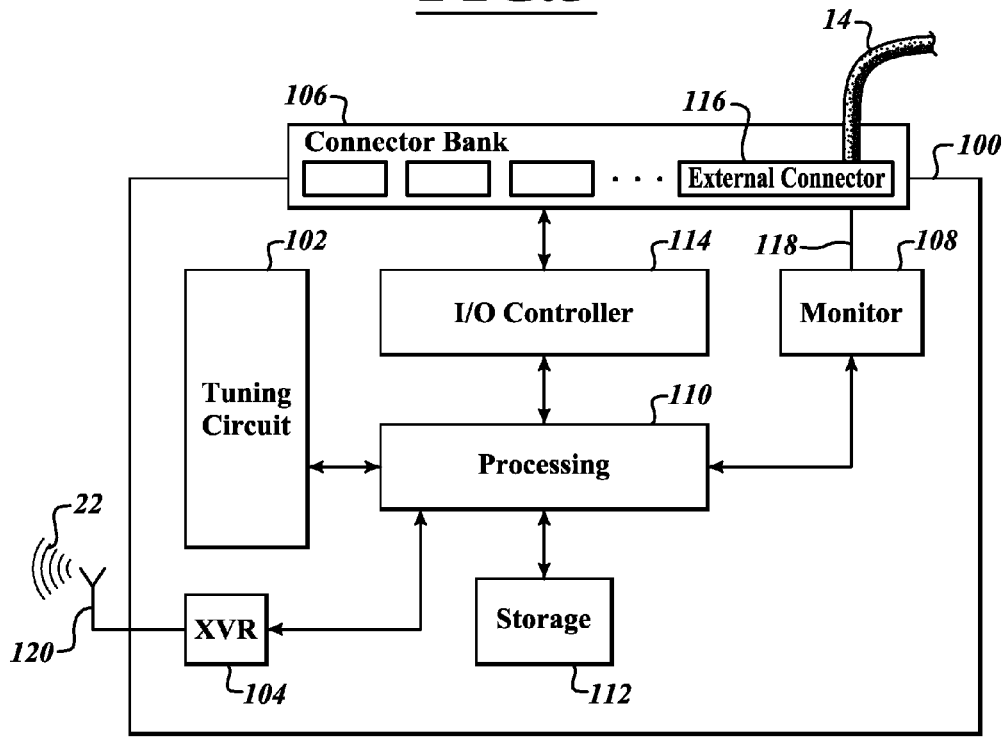
FIG. 4 is an exemplary block diagram of a client device.

FIG. 4 shows a schematic block diagram of one embodiment of a client device 100 that includes tuning circuit section 102, processing section 110, storage module 112, Input/Output controller section 114, transceiver module 104, antenna 120, and monitoring section 108.

Antenna 120 transmits and receives radio frequency signals to and from remote control 200. Antenna 120 is coupled to transceiver module 104 which is configured to interface the radio frequency signals received by the antenna 120 to digital signals suitable for processing by the processing section 110. Transceiver module 104 transmits and receives messages to and from remote control 200 over the first wireless communication link 22. Messages received by transceiver module 104 include commands for client device 100 to perform functions like selecting a channel or program, recording a program, playing back a recorded program, or time-shifting a program. Transceiver module 104 forwards the received command to processing section 110. Messages transmitted by transceiver module 104 include information about the power state of AV receiver 300. Transceiver module 104 receives information about the power state of AV receiver 300 from the monitoring section 108.

Monitoring section 108 is configured to determine whether a component attached thereto is in a fully ON power state or otherwise. Monitoring section 108 is coupled to at least one external connector 116 in the external connector bank 106. Monitoring section 108 monitors the power status of AV receiver 300 via a bidirectional bus in the first cable system 14. In one embodiment, monitoring section 108 and AV receiver 300 communicate via an HDMI-CEC bus of an HDMI cable and the at least one external connector 116 is an HDMI connector. The HDMI-CEC bus is a one-wire bus signal of the HDMI interface, the HDMI-CEC signal located on pin 13 of the standard 19-pin HDMI connector. Other bidirectional communication interfaces like Ethernet, Wi-Fi, 1294, USB and the like can also be used in accordance with various embodiments. Monitoring section 108 detects whether AV receiver 300 is in a fully ON power state, and sends the detected power status to transceiver module 104 for transmission to remote control 200. In one embodiment, monitoring section 108 is combined with transceiver module 104 in one integrated circuit package. Monitoring section 108 also informs the processing section 110 of the detected power state.

Monitoring section 108 may be physically and logically implemented in hardware, software, firmware and the like, or a combination thereof. Monitoring section 108 may also be combined with processing section 110, the combination being physically and logically implemented in hardware, software, firmware and the like, or a combination thereof.

Tuning circuit section 102 may be any hardware, software, firmware and/or other logic capable of receiving programming signal from one or more service providers. In various embodiments, service providers may include direct broadcast satellite provider like Dish Network or DirecTV, and broadband cable service provider, like Xfinity or CenturyLink. Tuning circuit section 102 includes one or more tuners and is configured to tune to one or more transponder frequencies to receive programming signals. Tuning circuit section 102 provides the programming signals to the processing section 110.

Processing section 110 includes a transport stream selector, a decoder module, and a storage controller module. The transport stream selector may be any hardware and/or software logic capable of selecting a desired media stream. The transport stream selector typically responds to a user input in selecting one encoded content from the programming signal and forwarding it to the decoder module for further processing. The decoder module may include one or more decoders for decoding, decompressing and/or otherwise processing received or stored content. Generally, a decoder extracts the appropriate MPEG packets from the transport stream and decodes them. In some embodiments, multiple decoders may be used in the decoder module to generate multiple video streams. The storage controller module generally controls the recording and playback functions of the client device 100.

The video stream generated by the processing section 110 is forwarded to the Input/Output Controller 114 that is configured to format the video stream for presentation on a desired display device. The Input/Output Controller 114 may encode the video stream before transmitting it to the display device 400. In one embodiment, the at least one connector 116 is an HDMI connector and the generated video stream is encoded for transmission over HDMI to AV receiver 300. In another embodiment, the video stream is encoded for transmission over S-video cable and also encoded for transmission over HDMI, the I/O controller outputting two encoded video streams through two connectors in connector bank 106. In yet another embodiment, the video stream is encoded for transmission over two separate HDMI connectors in connector bank 106.

The storage module 112 is any disk, memory or other digital storage media capable of storing programming, software instruction data and other digital content as desired. In various embodiments, storage module 112 is capable of storing digitized programs as part of a digital video recording implementation. The storage module is coupled to the processing section 110.

Figure 5:
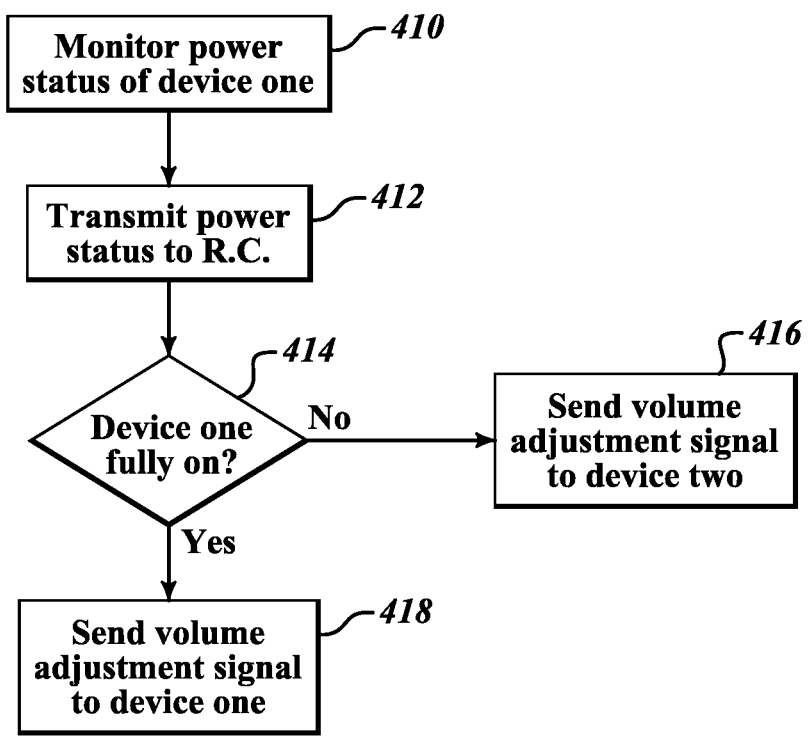

FIG. 5 depicts a method for dynamically changing a target device for volume control in accordance with an exemplary embodiment. In this regard, the steps shown in FIG. 5 may be executed using source or object code in any format that may be stored in memory, firmware, or other digital storage medium within the remote control 200 and/or client device 100. Such code may be executed by any module or combination of modules within each component.

At 410, client device 100 monitors the power status of the connected AV receiver 300 over the first cable system 14. in one embodiment, the first cable system is an HDMI cable, and client device 100 monitors the power status of AV receiver 300 over the HDMI-CEC bus. An example of the communication between client device 100 and AV receiver 300 through the HDMI-CEC bus includes the client device 100 sending a message asking AV receiver 300 to "give device power status" and AV receiver 300 responding by sending a message "reporting power status." HDMI specifications v1.3a are hereby incorporated by reference.

At 412, client device 100 transmits the power status of AV receiver 300 in a message over the first wireless communication link 22 to remote control 200.

At 414, remote control 200 receives the message and determines the target device for volume "punch through," whether to transmit the volume adjustment command to AV receiver 300 or display device 400.

If the message indicates that the AV receiver 300 is in a power state other than fully ON (416), then remote control 200 "punches through" any volume adjustment command to display device 400. If the message indicates that the AV receiver 300 is in a fully ON power state (418), then remote control 200 "punches through" any volume adjustment commands to AV receiver 300, Volume "punch through" is carried out while the remote control 200 remains in the FIRST MODE initially selected by user 10 to interact with client device 100. In one embodiment, the remote control 200 remains in the SAT MODE while allowing volume "punch through" to an Audio/video amplifier or to a television.

The various embodiments described above can be combined to provide further embodiments. Aspects of the embodiments can be modified, if necessary to employ concepts of the various patents, application and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a tuning circuit section, the tuning circuit section configured to receive programming signals;
a transceiver module, the transceiver module including a transmit section and a receive section configured to communicate with a remote control device over a wireless interface;
a control bus;
a monitoring section coupled to the control bus, the monitoring section configured to detect via the control bus a power status of a target device; and
a processing section coupled to the tuning circuit section, the transceiver section, the control bus, and the monitoring section, the processing section configured to:
receive from the monitoring section the power status of the target device, and
send to the remote control device, via the transceiver module, a message that includes the power status of the target device.

2. The device of claim 1 wherein the control bus is a signal bus of a high definition multimedia interface (HDMI) cable having a connector that includes a control pin.

3. The device of claim 1 wherein the transceiver module further comprises an antenna.

4. The device of claim 1 wherein the programming signals are provided by a broadcast entertainment service provider.

5. The device of claim 1 wherein the device is a set top box provided by a broadcast service provider, the set top box configured to receive, demodulate, decode, and process television programming signals for subsequent presentation on a display.

6. The device of claim 1 wherein the device is a client device within a television, configured to receive, demodulate, decode, and process television programming signals for subsequent presentation on a display.

7. The device of claim 1 wherein the target device is an audio-visual receiver that is coupled to the control bus, one or more displays, and one or more speakers within a home entertainment system.

8. The device of claim 1 wherein when the power status is fully ON, the message causes the remote control device to transmit volume adjustment commands directly to the target device without relying on user input.

9. A system comprising:
a transceiver module;
a monitoring section having access to a first target device via a bus;
a remote control device;
a processing section communicatively coupled to the transceiver, the monitoring section, and the remote control device; and a storage module communicatively coupled to the processing section, the storage module having computer-executable instructions stored thereon that when executed by the processing section cause the processing section to:

receive from the monitoring section, the power status of the first target device;

transmit the power status to the remote control device;

when the power status is fully ON, cause the remote control device to send a volume adjustment signal to the first target device; and when the power status is not fully ON, cause the remote control device to send a volume adjustment signal to a second target device.

10. The system of claim 9 wherein the volume adjustment signal further includes a control code associated with the target device.

11. The system of claim 9 wherein the volume adjustment signal further includes an audio level adjustment command.

12. The system of claim 9 wherein the monitoring section acquires the power status by querying the first target device.

13. The system of claim 9 wherein the transceiver includes an antenna that supports wireless communication between the processing section and the remote control device.

14. The system of claim 9 wherein the processing section and the storage module are components of a client device.

15. The system of claim 9 wherein the processing section and the storage module are components of the remote control device.

16. The system of claim 9 wherein the bus is an HDMI-type bi-directional bus.

17. The system of claim 9 wherein the transceiver module and the monitoring section are combined in one integrated circuit package.

18. The system of claim 9 wherein the monitoring section and the processing section are combined and implemented as one or more of hardware, firmware, software, and combinations thereof.

19. The system of claim 9 wherein the first target device is an audio-visual receiver of a home entertainment system.

20. The system of claim 9 wherein the second target device is a television.

* * * * *